(12) United States Patent
Galford

(10) Patent No.: US 10,823,876 B2
(45) Date of Patent: Nov. 3, 2020

(54) GEOCHEMICAL PHOTOELECTRIC LOGGING SYSTEMS AND METHODS

(71) Applicant: Halliburton Energy Services, Inc., Houston, TX (US)

(72) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/569,188

(22) PCT Filed: Oct. 21, 2016

(86) PCT No.: PCT/US2016/058035
§ 371 (c)(1),
(2) Date: Oct. 25, 2017

(87) PCT Pub. No.: WO2018/075056
PCT Pub. Date: Apr. 26, 2018

(65) Prior Publication Data
US 2020/0033497 A1 Jan. 30, 2020

(51) Int. Cl.
| | |
|---|---|
| *G01V 5/10* | (2006.01) |
| *G01V 5/06* | (2006.01) |
| *G01V 5/04* | (2006.01) |
| *G01V 5/12* | (2006.01) |

(52) U.S. Cl.
CPC .............. *G01V 5/12* (2013.01); *G01V 5/06* (2013.01); *G01V 5/10* (2013.01); *G01V 5/045* (2013.01)

(58) Field of Classification Search
CPC . G01V 5/045; G01V 5/06; G01V 5/10; G01V 5/104; G01V 5/12
See application file for complete search history.

(56) References Cited

U.S. PATENT DOCUMENTS

| | | | |
|---|---|---|---|
| 4,492,863 | A | 1/1985 | Smith |
| 4,810,876 | A | 3/1989 | Wraight et al. |
| 6,376,838 | B1 | 4/2002 | Odom |
| 7,342,222 | B2 | 3/2008 | Griffiths et al. |
| 2002/0096363 | A1 | 7/2002 | Evans et al. |
| 2016/0186556 | A1* | 6/2016 | Rasmus .................. G06F 17/11 703/2 |

* cited by examiner

*Primary Examiner* — Mark R Gaworecki
(74) *Attorney, Agent, or Firm* — John W. Wustenberg; Parker Justiss, P.C.

(57) ABSTRACT

A system includes a logging tool assembly having a geochemical logging tool with a neutron source and a gamma ray detector, wherein the geochemical logging tool collects formation property measurements as a function of position in a borehole. The system also includes a processor that receives the formation property measurements and that derives a geochemical photoelectric log based at least in part on the formation property measurements. The system also includes an output that displays the geochemical photoelectric log to a user.

14 Claims, 9 Drawing Sheets

GEOCHEMICAL PHOTOELECTRIC LOGGING SYSTEMS AND METHODS

CROSS-REFERENCE TO RELATED APPLICATION

This application is the National Stage of, and therefore claims the benefit of, International Application No. PCT/US2016/058035 filed on Oct. 21, 2016, entitled "GEOCHEMICAL PHOTOELECTRIC LOGGING SYSTEMS AND METHODS". The above application is commonly assigned with this National Stage application and is incorporated herein by reference in its entirety.

BACKGROUND

Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging."

Photoelectric logs from lithodensity logging tools have become a mainstay of modern logging and they are a valuable aid to formation evaluation and mineralogy identification. Photoelectric ($P_e$) measurements from gamma-gamma density tools whose instrumentation supports the collection of pulse-height gamma ray spectra, also known as lithodensity tools, have been around since the late 1970s. The measurement technique relies on counting detected low-energy gamma rays which are affected by photoelectric absorption as well as higher energy Compton-scattered gamma rays. The ratio of these counting rates can be transformed into $P_e$ using techniques well known to those skilled in the art. Lithodensity $P_e$ logs can be strongly affected by logging conditions when the mud contains high Z materials such as barite, or when the pad loses contact with the borehole wall. The presence of a mudcake between the pad and the borehole wall can also affect the measurement, especially when barite is used to weight the mud. As a consequence, the macroscopic photoelectric absorption cross section, U, may also be compromised and not usable to interpret complex rock matrix mineralogies.

Another logging tool, referred to herein as a geochemical logging tool, can obtain neutron-induced gamma ray elemental spectroscopy measurements. The validity of formation elemental concentrations derived from geochemical logging tool measurements are sometimes brought into question. For example, geochemical log results may be challenged on the basis of erroneous laboratory elemental data from samples of core material. Efforts to improve upon logging tool technology and the interpretation of available measurements are ongoing.

BRIEF DESCRIPTION OF THE DRAWINGS

Accordingly, there are disclosed in the drawings and the following description geochemical photoelectric logging systems and methods. In the drawings.

Figure 1:
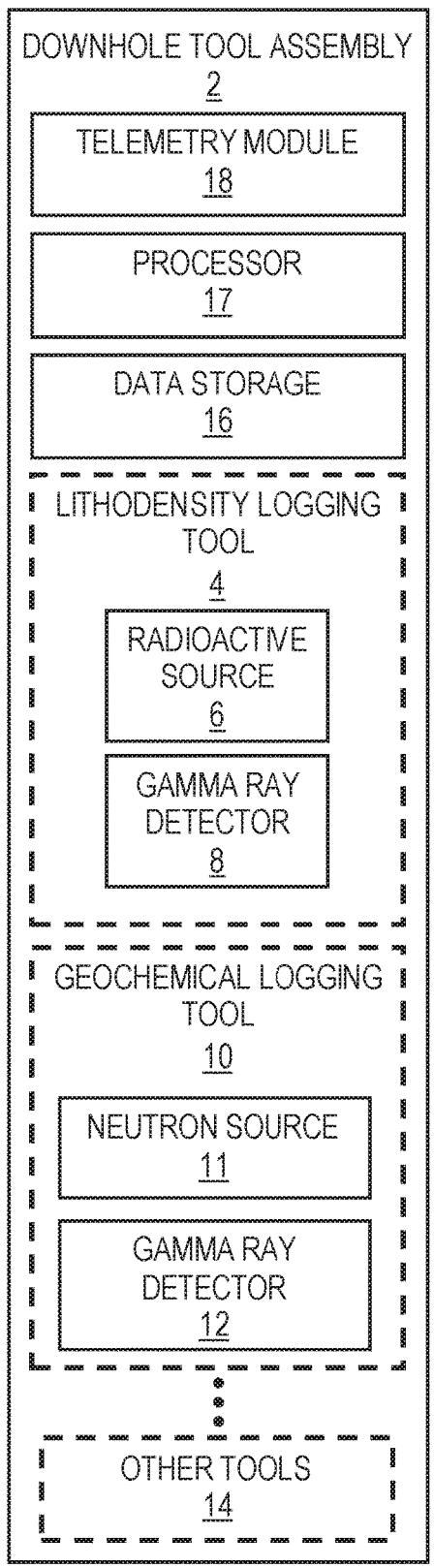
FIG. 1 is a block diagram showing an illustrative downhole tool assembly.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

Disclosed herein are geochemical photoelectric logging systems and methods. With the disclosed embodiments, measurements from a geochemical logging tool having a neutron source and a gamma ray detector are used to derive a geochemical photoelectric log. The geochemical photoelectric log described herein is separate from other types of photoelectric logs. In different embodiments, the geochemical photoelectric log can be considered independently or in combination with other types of logs, including other photoelectric logs. For example, measurements from a lithodensity logging tool having a radioactive source and a gamma ray detector can be used to derive a lithodensity photoelectric log. In some embodiments, a lithodensity photoelectric log and a geochemical photoelectric log obtained for the same borehole can be compared. The comparison may result in validation of at least some of a lithodensity photoelectric log, a geochemical photoelectric log, dry rock elemental concentrations obtained from measurements of a geochemical logging tool, and/or other logging results. Additionally or alternatively, the comparison may result in identification of problem zones for portions of a lithodensity photoelectric log, a geochemical photoelectric log, dry rock elemental concentrations obtained from measurements of a geochemical logging tool, and/or other logging results. As an example, a geochemical photoelectric log can be used to identify portions of a lithodensity photoelectric log that are affected by mudcake, loss of contact between a lithodensity logging tool pad and a borehole wall, and/or other issues. In addition, a geochemical logging tool may be deployed (and a geochemical photoelectric log obtained) in heavy mud environments or other environments, where lithodensity logging tools are not effective.

To derive a geochemical photoelectric log as described herein, measurements from a geochemical logging tool are used to determine dry rock elemental concentrations. As used herein, "dry rock" refers to the rock matrix portion of a formation (separate from fluids that may be present). The determined dry rock elemental concentrations may vary for different geochemical logging tools and can be expressed as weight fractions. In at least some embodiments, a geochemical matrix photoelectric factor is determined based at least in part on the determined dry rock elemental concentrations. The geochemical matrix photoelectric factor may also be a function of an inorganic carbon concentration estimate. Also, the geochemical matrix photoelectric factor may be a function of a matrix oxygen estimate. In at least some embodiments, the geochemical matrix photoelectric factor is combined with a formation fluid photoelectric factor to determine formation photoelectric factor values used for the geochemical photoelectric log. The formation fluid photoelectric factor may vary for different boreholes and may be estimated using a predetermined oil-base mud value, a predetermined water-based mud value, and/or another estimate. Also, in at least some embodiments, the geochemical matrix photoelectric factor values and the formation fluid photoelectric factor values are scaled based on a formation fluid weight fraction. The resulting formation photoelectric factor values used for the geochemical photoelectric log are intended to be comparable to lithodensity photoelectric factor values such that the resulting geochemical photoelectric log can be used instead of, or in combination with, a lithodensity photoelectric log as described herein.

In at least some embodiments, an example system includes a logging tool assembly having a geochemical logging tool with a neutron source and a gamma ray detector, wherein the geochemical logging tool collects formation property measurements as a function of position in a borehole. The system also includes at least one processor that determines dry rock elemental concentration values from the collected formation property measurements and that derives a geochemical photoelectric log based at least in part on the dry rock elemental concentration values.

Meanwhile, an example method includes deploying a logging tool assembly in a borehole, wherein the logging tool assembly has a geochemical logging tool with a neutron source and a gamma ray detector. The method also includes collecting formation property measurements with the geochemical logging tool as a function of position in the borehole. The method also includes determining, by at least one processor, dry rock elemental concentration values from the collected formation property measurements. The method also includes deriving, by the at least one processor, a geochemical photoelectric log based on at least some of the dry rock elemental concentration values. Various geochemical photoelectric logging tool options, geochemical photoelectric log derivation options, and geochemical photoelectric log use options are described herein.

The disclosed methods and systems are best understood when described in an illustrative usage context. FIG. 1 is a block diagram showing an illustrative downhole tool assembly 2. In at least some embodiments, the downhole tool assembly 2 includes a lithodensity logging tool 4 with a radioactive source 6 and a gamma ray detector 8. The downhole tool assembly 2 also includes a geochemical logging tool 10 with a neutron source 11 and a gamma ray detector 12. The operations and measured phenomena related to the lithodensity logging tool 4 and the geochemical logging tool 10 vary and are understood. Also, it should be appreciated that different types of lithodensity logging tools and geochemical logging tools are available. Regardless of variations, for purposes of this disclosure, lithodensity logging tools such as the lithodensity logging tool 4 are able to collect measurements from which lithodensity logs, including lithodensity photoelectric logs can be derived. Meanwhile, geochemical logging tools such as the geochemical logging tool 10 are able to collect formation property measurements from which dry rock elemental concentration values can be determined. The set of elements corresponding to the determined dry rock elemental concentration values may vary for different types of geochemical logging tools. Regardless of such variance, for purposes of this disclosure, dry rock elemental concentration logs obtained from measurements collected by the geochemical logging tool 10 can be used to derive a new type of log, referred to herein as a geochemical photoelectric log. Various options for deriving a geochemical photoelectric log are described herein.

Different embodiments of the logging tool assembly 2 are possible. For example, in one embodiment, the lithodensity logging tool 4 is omitted. In another embodiments, the lithodensity logging tool 4 and the geochemical logging tool 10 are within a single tool body. In another embodiment, the lithodensity logging tool 4 and the geochemical logging tool 10 of the logging tool assembly 2 are distributed across a plurality of tool bodies. The plurality of tool bodies of the logging tool assembly 2 can be coupled to each other directly or indirectly. Also, the coupling of tool bodies can be rigid or flexible. For example, in a logging-while-drilling scenario, a rigid coupling between tool bodies is needed. Meanwhile, in a wireline logging scenario, a rigid or flexible coupling between tool bodies may be used. The coupling components between tool bodies of the logging tool assembly 2 may be, for example, a wireline, an umbilical, a slick line, coiled tubing, metallic tubulars (drillstring or casing segments), wired tubulars, or other couplers. In one embodiment, different tools of the logging tool assembly 2 are on opposite sides of a mud motor to facilitate near-bit or at-bit measurements.

As shown in FIG. 1, the logging tool assembly 2 also include other tools 14. As an example, tools to obtain bit size logs and borehole diameter logs may be included with the logging tool assembly. In addition, the logging tool assembly 2 includes data storage 16 for storing measurements collected by the lithodensity logging tool 4, the geochemical logging tool 10, and/or the other tool 14. The data storage 16 may also store values derived by the processor 17 from the available measurements (e.g., bit size values, borehole diameter values, gamma ray values, dry rock elemental concentration values, geochemical photoelectric values, lithodensity photoelectric values, density values, porosity values). At least some of the available measurements and/or derived values are provided to a telemetry module 18, which conveys the available measurements and/or derived values to earth's surface and/or to other downhole tools via an available telemetry channel compatible with the telemetry module 18. Example telemetry techniques include mud pulse telemetry, acoustic telemetry, electromagnetic telemetry (wired or wireless), or other known telemetry options. At earth's surface, the derived values (or related logs or images) are obtained as outputs from the downhole tool assembly 2. The outputs can be displayed using a display device (e.g., a computer or printer). As an option, the outputs can analyzed with or without involvement of a user. Additionally or alternatively, the outputs may be conveyed from the telemetry module 19 to another downhole tool configured to analyze the outputs and/or to perform one or more downhole operations in response to the outputs or commands derived therefrom. Regardless of whether the outputs are analyzed downhole or at earth's surface, various operations such as directional drilling operations, perforating operations and/or other well completion operations, fluid flow control operations, and/or well intervention operations can be performed in response to the outputs or commands derived therefrom.

In at least some embodiments, a set of logs can be provided to a customer. Example logs include, but are not limited to, bit size logs, borehole diameter (caliper) logs, gamma ray logs, dry rock elemental concentration logs, geochemical photoelectric logs, lithodensity photoelectric logs, density logs, and porosity logs. Such logs may display values as a function of depth. While such logs can be provided individually to a customer, providing the logs together facilitates comparison and analysis. Customers may use the provided logs to make decisions related to perforating operations and/or other well completion operations, fluid flow control operations, and/or well intervention operations. Additionally or alternatively, geochemical photoelectric log values can be applied to subsequent formation analysis by calculating macroscopic photoelectric absorption cross section response values that may be used to compute detailed mineral volumes comprising the rock matrix in log interpretation programs.

Figure 2A:
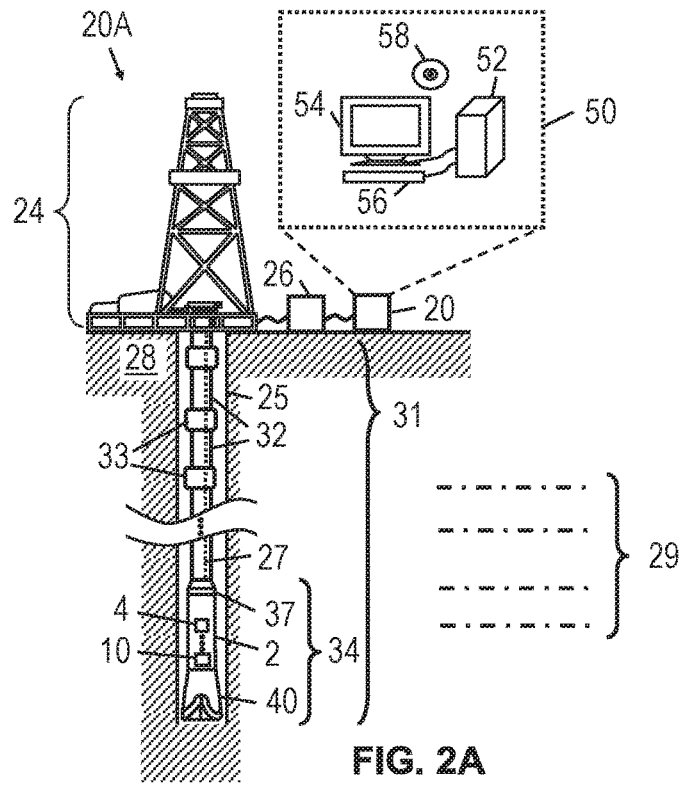
FIG. 2A is a schematic diagram showing an illustrative drilling environment.

FIG. 2A is a schematic diagram showing an illustrative drilling environment 20A that may include a logging tool assembly 2. In FIG. 2A, a drilling assembly 24 enables a drill string 31 to be lowered and raised in a borehole 25 that penetrates formations 29 of the earth 28. The drill string 31 is formed, for example, from a modular set of drill string segments 32 and couplers 33. At the lower end of the drill string 31, a bottomhole assembly 34 with a drill bit 40 removes material from the formations 29 using known drilling techniques. The bottomhole assembly 34 also includes one or more drill collars 37 and downhole tool assembly 2. As previously described with respect to FIG. 1, the downhole tool assembly 2 includes a geochemical logging tool 10 as well as an optional lithodensity logging tool 4. The geochemical logging tool 10 obtains measurements in the borehole 25 from which a geochemical photoelectric log is derived as described herein.

In accordance with at least some embodiments, measurements obtained by the downhole tool assembly 2 are analyzed and derived parameters (e.g., bit size values, borehole diameter values, gamma ray values, dry rock elemental concentration values, geochemical photoelectric values, lithodensity photoelectric values, density values, porosity values, etc.) are conveyed to earth's surface using known telemetry techniques (e.g., wired pipe telemetry, mud pulse telemetry, acoustic telemetry, electromagnetic telemetry) and/or are stored by the downhole tool assembly 2. In at least some embodiments, a cable 27 may extend from the BHA 34 to earth's surface. For example, the cable 27 may take different forms such as embedded electrical conductors and/or optical waveguides (e.g., fibers) to enable transfer of power and/or communications between the bottomhole assembly 34 and earth's surface. In different embodiments, the cable 27 may be integrated with, attached to, or inside the modular components of the drill string 31.

In FIG. 2A, an interface 26 at earth's surface receives the collected measurements and/or derived parameters via cable 27 or another telemetry channel and conveys the collected measurements and/or derived parameters to a computer system 50. In some embodiments, the surface interface 26 and/or the computer system 50 may perform various operations such as converting signals from one format to another and storing collected measurements and/or derived parameters. The computer system 50 also may operate to collect measurements and/or derived parameters to provide logs, images, or updated downhole formation models. Directional drilling operations and/or other downhole operations (e.g., fluid flow control, pressure control, valve position adjustment, logging tool updates) can be updated based on analysis of the collected measurements and/or derived parameters. In different embodiments, a user can interact with the computer system 50 to select analysis or response options (e.g., logs, images, direction drilling updates, downhole operation updates) Additionally or alternatively, analysis or response options can are automated (e.g., based on predetermined rules).

In at least some embodiments, the computer system 50 includes a processing unit 52 that performs analysis or response operations by executing software or instructions obtained from a local or remote non-transitory computer-readable medium 58. The computer system 50 also may include input device(s) 56 (e.g., a keyboard, mouse, touchpad, etc.) and output device(s) 54 (e.g., a monitor, printer, etc.). Such input device(s) 56 and/or output device(s) 54 provide a user interface that enables an operator to interact with the modular downhole tool 2 and/or software executed by the processing unit 52. For example, the computer system 50 may enable an operator to select logging options, to select analysis options, to view obtained measurements, to view derived parameters (e.g., logs or images) obtained from the measurements, to adjust directional drilling, to adjust downhole operations, and/or to perform other tasks. Further, information about the downhole position at which measurements are obtained may be taken into account and used to facilitate well completion decisions and/or other strategic decisions related to producing hydrocarbons.

Figure 2B:
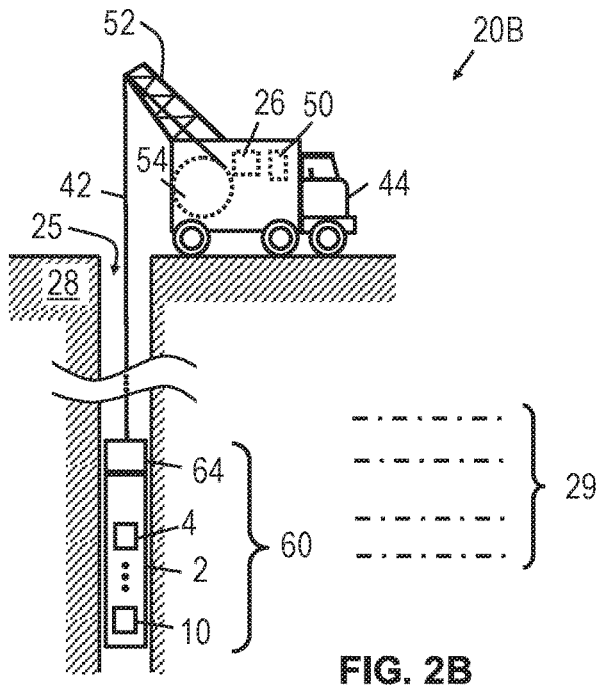
FIG. 2B is a schematic diagram showing an illustrative wireline environment.

At various times during the drilling process, the drill string 31 shown in FIG. 2A may be removed from the borehole 25. With the drill string 31 removed, another option for deploying a modular downhole tool 2 involves the wireline environment 20B of FIG. 2B. In FIG. 2B, a wireline tool string 60 is suspended in a borehole 25 that penetrates formations 29 of the earth 28. For example, the wireline tool string 60 may be suspended by a cable 42 having conductors and/or optical fibers for conveying power to the wireline tool string 60. The cable 42 may also be used as a communication interface for uphole and/or downhole communications. In at least some embodiments, the cable 42 wraps and unwraps as needed around cable reel 54 when lowering or raising the wireline tool string 60. As shown, the cable reel 54 may be part of a movable logging facility or vehicle 42 having a cable guide 52.

In at least some embodiments, the wireline tool string 60 includes a downhole tool assembly 2. As previously described with respect to FIG. 1, the downhole tool assembly 2 includes a geochemical logging tool 10 as well as an optional lithodensity logging tool 4. The wireline tool string 60 may also include other tools or electronics 64. The measurements collected by the downhole tool assembly 2 are conveyed to earth's surface and/or are stored by the wireline tool string 60. In either case, the measurements can be used to derive parameters (e.g., borehole diameter values, gamma ray values, dry rock elemental concentration values, geochemical photoelectric values, lithodensity photoelectric values, density values, porosity values, etc.).

At earth's surface, a surface interface 26 receives the collected measurements and/or derived parameters via the cable 42 and conveys the collected measurements and/or derived parameters to a computer system 50. As previously discussed, the interface 26 and/or computer system 50 (e.g., part of the movable logging facility or vehicle 44) may perform various operations such as converting signals from one format to another and storing collected measurements and/or derived parameters. The computer system 50 also may operate to analyze collected measurements and/or derived parameters to provide logs, images, or updated downhole formation models. As an example, the derived parameters may correspond to borehole diameter values, gamma ray values, dry rock elemental concentration values, geochemical photoelectric values, lithodensity photoelectric values, density values, porosity values, etc. Related logs or images can be displayed and/or provided to a customer. With or without user input, the derived parameters can be used to adjust ongoing or future downhole operations in the borehole 25 or a nearby borehole.

A brief description of the development of the geochemical photoelectric logging concept and related issues follows. The discussion below is intended to at least provide an understanding of geochemical photoelectric logging relative to other photoelectric analysis, and is not intended to limit the disclosure to a particular embodiment. The geochemical photoelectric logging concept was developed to provide a quality check of geochemical logging data when conditions are suitable to record a good $P_e$ measurement with lithodensity logging tools. However, it should be appreciated that geochemical photoelectric logging can also aid petrophysical interpretations of complex reservoirs in wells drilled with heavy muds by combining the geochemical $P_e$ log with a standard density log to produce a macroscopic photoelectric absorption cross section. This would enable an additional response equation in log interpretation programs such as FAME so that an additional mineral volume could be included in the formation interpretation model.

While the geochemical photoelectric logging concept was developed for use with Halliburton's GEM™ tool, it can also be used with other wireline tools or logging-while-drilling (LWD) tools that determine dry rock elemental concentrations. Geochemical photoelectric logging is also applicable to future geochemical tool developments which may employ neutron generators instead of chemical sources, or which may be capable of measuring additional elements to those currently available with the GEM™ tool. With geochemical photoelectric, the macroscopic photoelectric absorption cross section response equation in log interpretation programs can be used even when the lithodensity $P_e$ measurement is compromised in wells drilled with heavy muds (density greater than 11-12 lbm/gal). Also, geochemical photoelectric logging method is readily adaptable to future geochemical tool developments which may be able to measure additional important rock-forming elemental concentrations such as sodium and carbon.

Aside from basic links between $P_e$ values of 1.83 for quartz sandstone, 3.1 for pure dolomite, and 5.1 for pure calcite, the most common usage of $P_e$ has been in the form of the macroscopic photoelectric absorption cross section, $U=\rho_e P_e$, where $\rho_e$ is the electron density. This usage is convenient because it lends itself to a volumetric mixing law for fluids and minerals and thus fits nicely with log interpretation methods that express the formation as a mixture of component volumes. However, the $P_e$ of a mixture can be expressed as a sum of individual $P_e$ values that are combined according to mass fractions:

$$P_e = \sum_{i=1}^{n} W_i P_{e,i} \qquad (1)$$

where $W_i$ is the mass fraction of constituent i, and $P_{e,i}$ is the photoelectric factor of constituent i. As shown in Bertozzi, W., Ellis, D. V., Wahl, J. S., (1981) "The physical foundation of formation lithology logging with gamma rays," *Geophysics* 46 (10) pp 1435-1455, the photoelectric absorption cross section, $\sigma_{pe}$, in barns/atom is proportional to the atomic number, Z, and gamma ray energy, $E_\gamma$:

$$\sigma_{pe} = \frac{12.1 Z^{4.6}}{E_\gamma^{3.15}}. \qquad (2)$$

Figure 3:
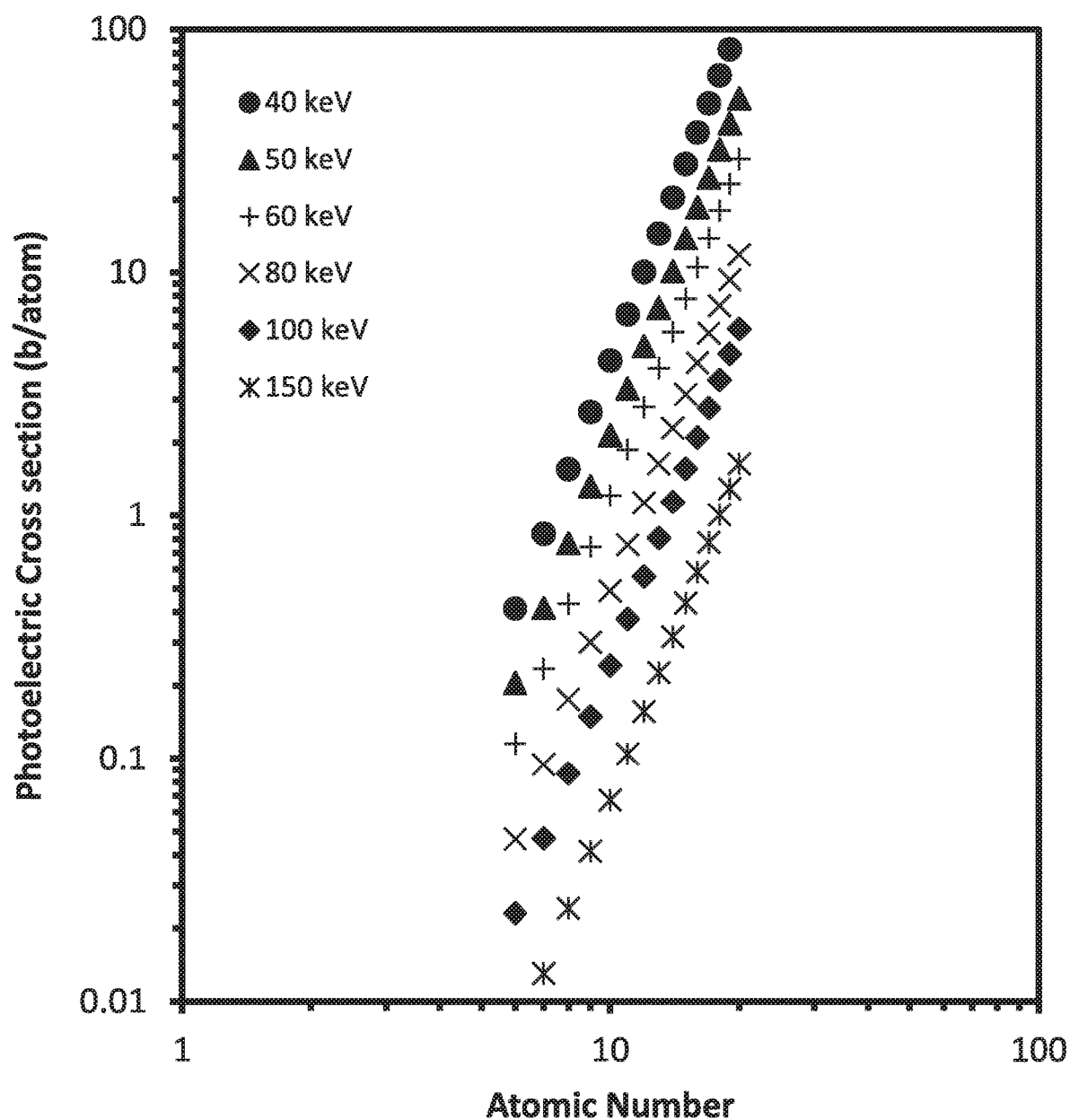
FIG. 3 is a graph showing photoelectric absorption cross section values as a function of atomic number and gamma ray energy.

FIG. 3 is a graph showing photoelectric absorption cross section values as a function of atomic number and gamma ray energy. As shown in FIG. 3, the photoelectric absorption cross section varies significantly by atomic number and gamma ray energy. For earth formations, the photoelectric effect is the dominant interaction process for gamma ray energies below approximately 100 keV. For practical purposes, the effective photoelectric absorption cross section is integrated from 40 to 80 keV. The customary photoelectric factor is defined from a proportional relationship involving photoelectric absorption cross section and the atomic number:

$$P_e \propto \frac{\sigma_{pe}}{Z}. \qquad (3)$$

Figure 4:
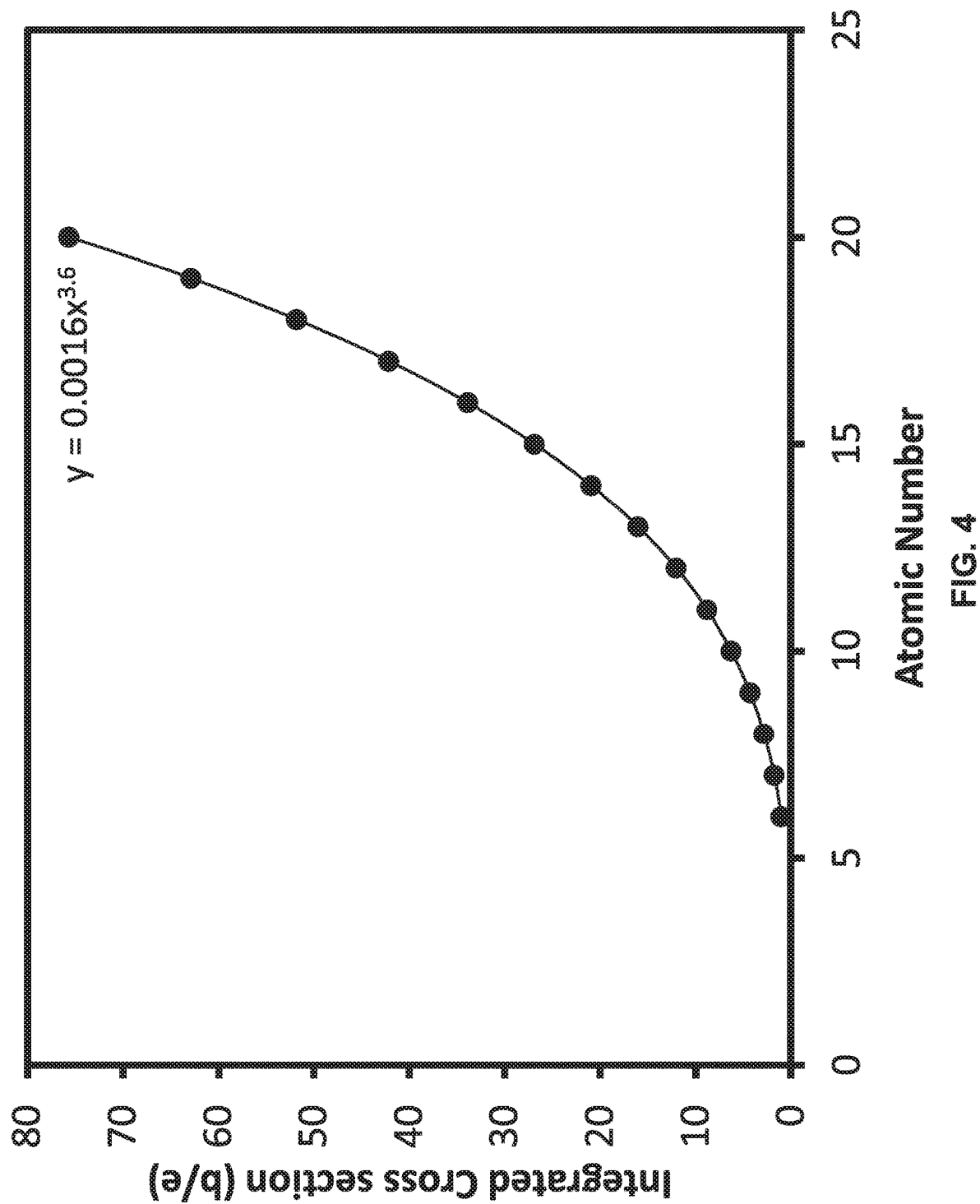
FIG. 4 is a graph showing integrated photoelectric absorption cross section values as a function of atomic number.

FIG. 4 shows the proportional relationship linking the integrated photoelectric absorption cross section for 40 to 80 keV gamma rays and the atomic number. A constant of proportionality can be determined by normalizing to the integrated $\sigma_{pe}/Z$ ratio for Z=10 that will lead to the customary definition of the photoelectric factor:

$$P_e = \frac{\int_{40}^{80} \frac{12.1 Z^{4.6}}{E_\gamma^{3.15}} dE_\gamma}{6.237986 Z} = \left(\frac{Z}{10}\right)^{3.6}. \qquad (4)$$

Working with equation 4, the $P_e$ values for the most important elements in downhole logging are given in Table 1.

TABLE 1

| Element | Z | $P_e$ |
|---------|----|----------|
| H | 1 | 0.000251 |
| C | 6 | 0.158981 |
| O | 8 | 0.447841 |
| Na | 11 | 1.409333 |
| Mg | 12 | 1.927758 |
| Al | 13 | 2.571556 |

TABLE 1-continued

| Element | Z | $P_e$ |
|---|---|---|
| Si | 14 | 3.357847 |
| S | 16 | 5.430401 |
| Cl | 17 | 6.754856 |
| K | 19 | 10.08122 |
| Ca | 20 | 12.12573 |
| Ti | 22 | 17.0892 |
| Mn | 25 | 27.07597 |
| Fe | 26 | 31.18201 |

For the specific embodiment of Geochemical photoelectric logging with the GEM™ tool, the geochemical $P_e$ calculation considers measured elemental concentrations expressed as weight fractions of magnesium, aluminum, silicon, sulfur, potassium, calcium, titanium, manganese, and iron in the dry rock matrix. An inorganic carbon concentration can be computed by assuming magnesium is associated with dolomite and any excess calcium beyond the amount required to satisfy the dolomite requirement is associated with calcite. Also, a model that assumes the sum of the measured elemental weight fractions plus inorganic carbon and matrix oxygen equals 1 may be used. With these concepts in mind and building on the formalism of equation 1, a geochemical matrix photoelectric factor, $P_{e,m}^g$, can be computed as:

$$P_{e,m}^g = W_C P_{e,C} + W_O P_{e,O} + W_{Mg} P_{e,Mg} + W_{Al} P_{e,Al} + W_{Si} P_{e,Si} + W_S P_{e,S} + W_K P_{e,K} + W_{Ca} P_{e,Ca} + W_{Ti} P_{e,Ti} + W_{Mn} P_{e,Mn} + W_{Fe} P_{e,Fe} \quad (5)$$

where chemical symbols in the subscripts indicate the elemental component. Also, the inorganic carbon weight fraction can be computed as:

$$W_C = k_1 W_{Ca} - k_2 W_{Mg}, \quad (6)$$

where $k_1$ and $k_2$ are predetermined constants. In at least some embodiments, $k_1 = 0.299683$ and $k_2 = 0.494166$. Other values for $k_1$ and $k_2$ are possible.

Meanwhile, the weight fraction of matrix oxygen, $W_O$, can be defined as:

$$W_O = 1 - W_C - W_{Mg} - W_{Al} - W_{Si} - W_S - W_K - W_{Ca} - W_{Ti} - W_{Mn} - W_{Fe}. \quad (7)$$

In at least some embodiments, the geochemical matrix photoelectric factor is combined with the formation fluid photoelectric factor to produce a $P_e$ value that is compatible with lithodensity photoelectric factors:

$$P_e^g = W_f P_{e,f} + (1 - W_f) P_{e,m}^g \quad (8)$$

where $P_e^g$ is the geochemical photoelectric factor for the formation, $W_f$ is the formation fluid weight fraction, and $P_{e,f}$ is the formation fluid photoelectric factor. The formation fluid weight fraction depends on formation bulk density, $\rho_b$, porosity, $\phi$, which can be estimated from a neutron-density crossplot, and fluid density, $\rho_f$:

$$W_f = \frac{\phi \rho_f}{\rho_b}. \quad (9)$$

The formation fluid photoelectric factor depends on the near wellbore fluid composition. For reservoir rocks, a suitable estimate can be made by assuming the pore fluid is comprised of invaded mud filtrate. For oil-based muds, $P_{e,f}$ can be approximated by 0.125, and for water-based muds $P_{e,f}$ can be estimated according to mud filtrate salinity or alternatively fluid density:

$$P_{e,f} = k_3 \rho_f - k_4, \quad (10)$$

where $k_3$ and $k_4$ are predetermined constants. In at least some embodiments, $k_3 = 5.05509924$ and $k_4 = 4.6827784$. Other values for $k_3$ and $k_4$ are possible.

In at least some embodiments, geochemical photoelectric logging makes it possible to use the macroscopic photoelectric absorption cross section response equation in log interpretation programs even when the lithodensity $P_e$ measurement is compromised in wells drilled with muds whose density is greater than 11-12 lbm/gal. Also, geochemical photoelectric logging method is readily adaptable to future geochemical tool developments which may be able to measure additional important rock-forming elemental concentrations such as sodium and carbon.

For at least some geochemical logging tool embodiments, the dry rock elemental concentrations that can be determined include carbon, sodium, magnesium, aluminum, silicon, sulfur, potassium, calcium, titanium, manganese, and iron from the dry rock matrix. Other geochemical logging tool embodiments can determine fewer dry rock elemental concentrations (e.g., magnesium, aluminum, silicon, sulfur, potassium, calcium, titanium, manganese and iron) that still provide good results for deriving a geochemical photoelectric log. In at least some embodiments, a formation porosity value obtained from a neutron-density crossplot is used to compute the formation fluid weight fraction because the porosity determination does not require matrix parameters to be known a priori. In alternative embodiments, other sources of formation porosity (e.g., density, neutron, and/or acoustic porosity measurements) may be used provided appropriate response parameters are available to compute the porosity. Porosity from a nuclear magnetic resonance measurement would be one suitable option because it is a direct measurement that does not require interpretation.

Figure 5:
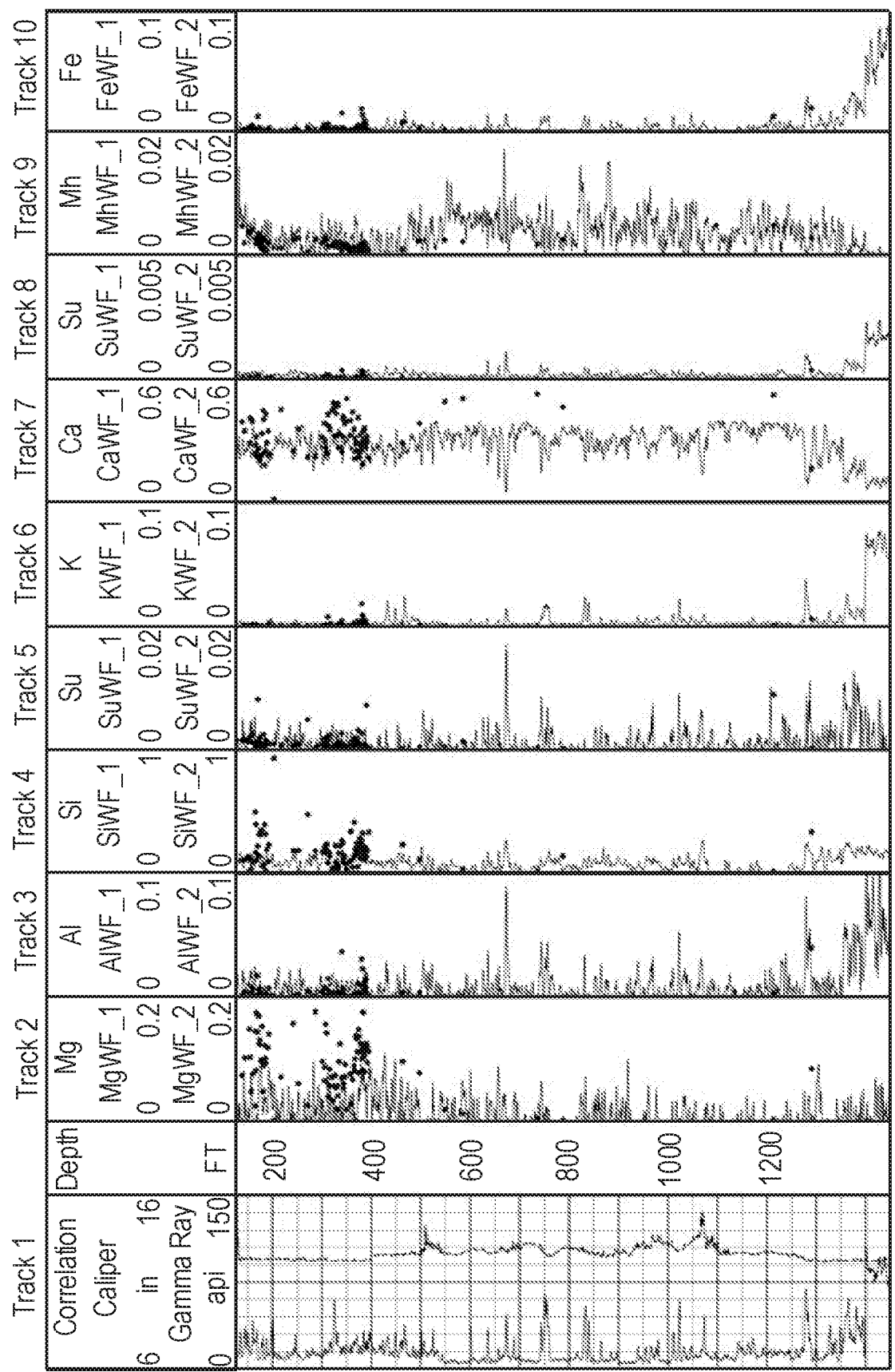
FIG. 5 is a log chart showing illustrative log tracks and laboratory x-ray fluorescence (XRF) concentration values.

The idea for geochemical photoelectric logging arose from a review of dry rock elemental concentration log results from a geochemical logging tool with laboratory x-ray fluorescence (XRF) elemental concentrations results. FIG. 5 is a log chart with illustrative log tracks and XRF concentration values. More specifically, Track 1 of FIG. 5 shows caliper and gamma ray logs for a well drilled with 9.8 lbm/gal oil-based mud and a 12.25-in. bit. Solid black traces in Tracks 2-10 are dry rock elemental weight fractions obtained with a geochemical logging tool. Meanwhile, the circles show XRF values. At the top of the logged interval, where most of the XRF data appears, there are obvious discrepancies between the magnesium, silicon, and calcium core data and the geochemical logging tool values. Accordingly, a way of validating the dry rock elemental concentration log results from the geochemical logging tool was desired, resulting in the geochemical photoelectric logging concepts described herein.

Figure 7:
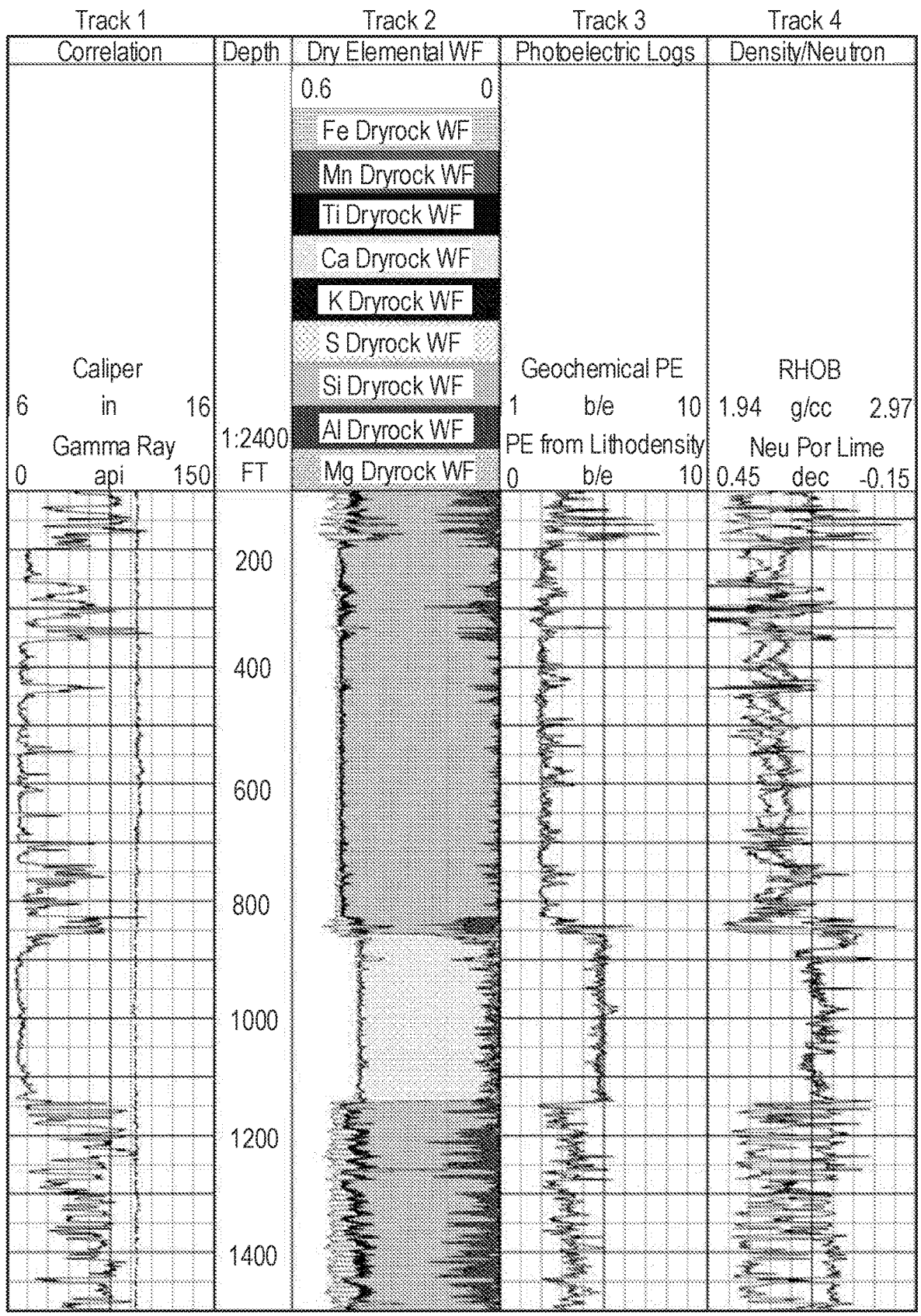
Figure 8:
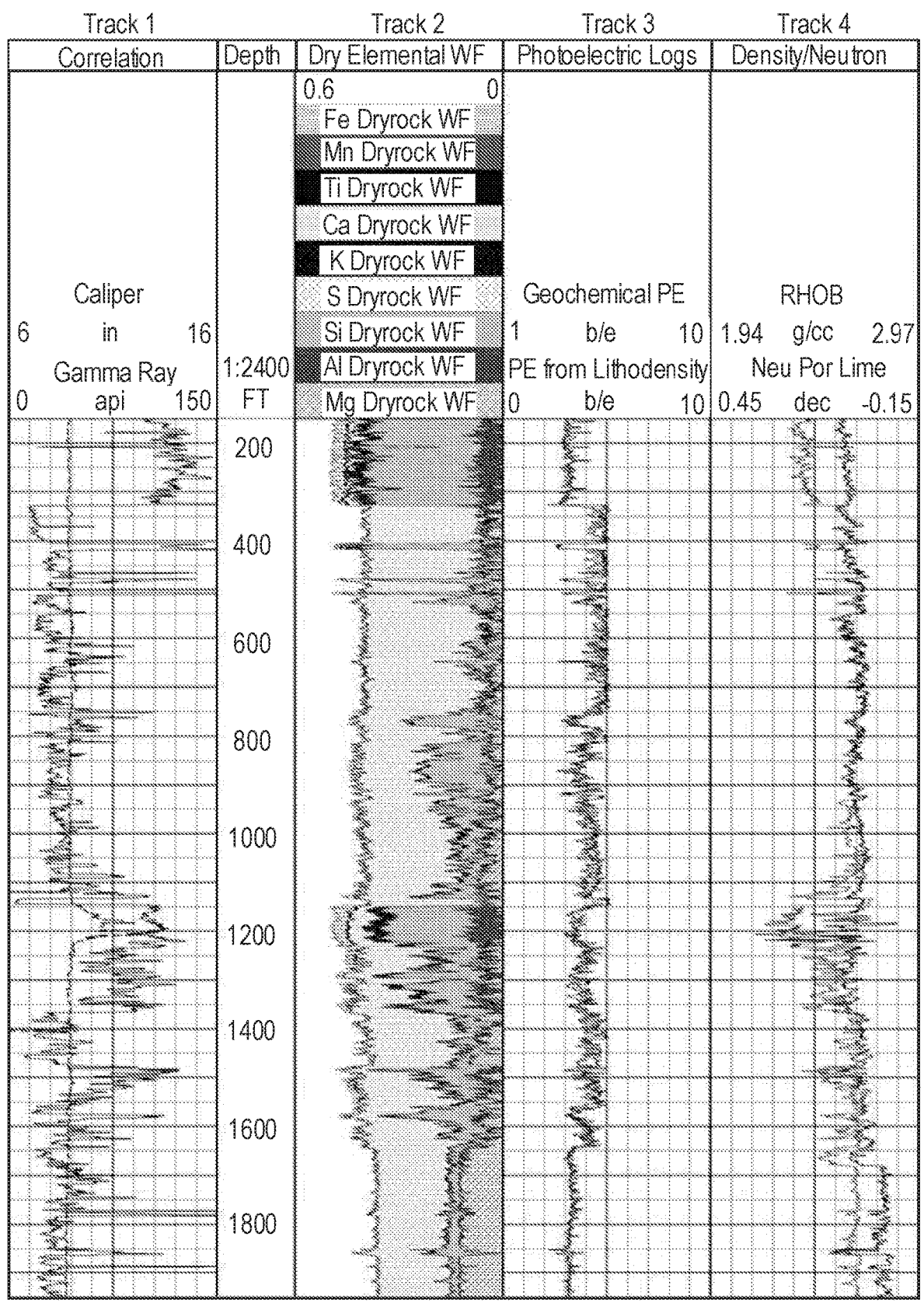
Figure 9:
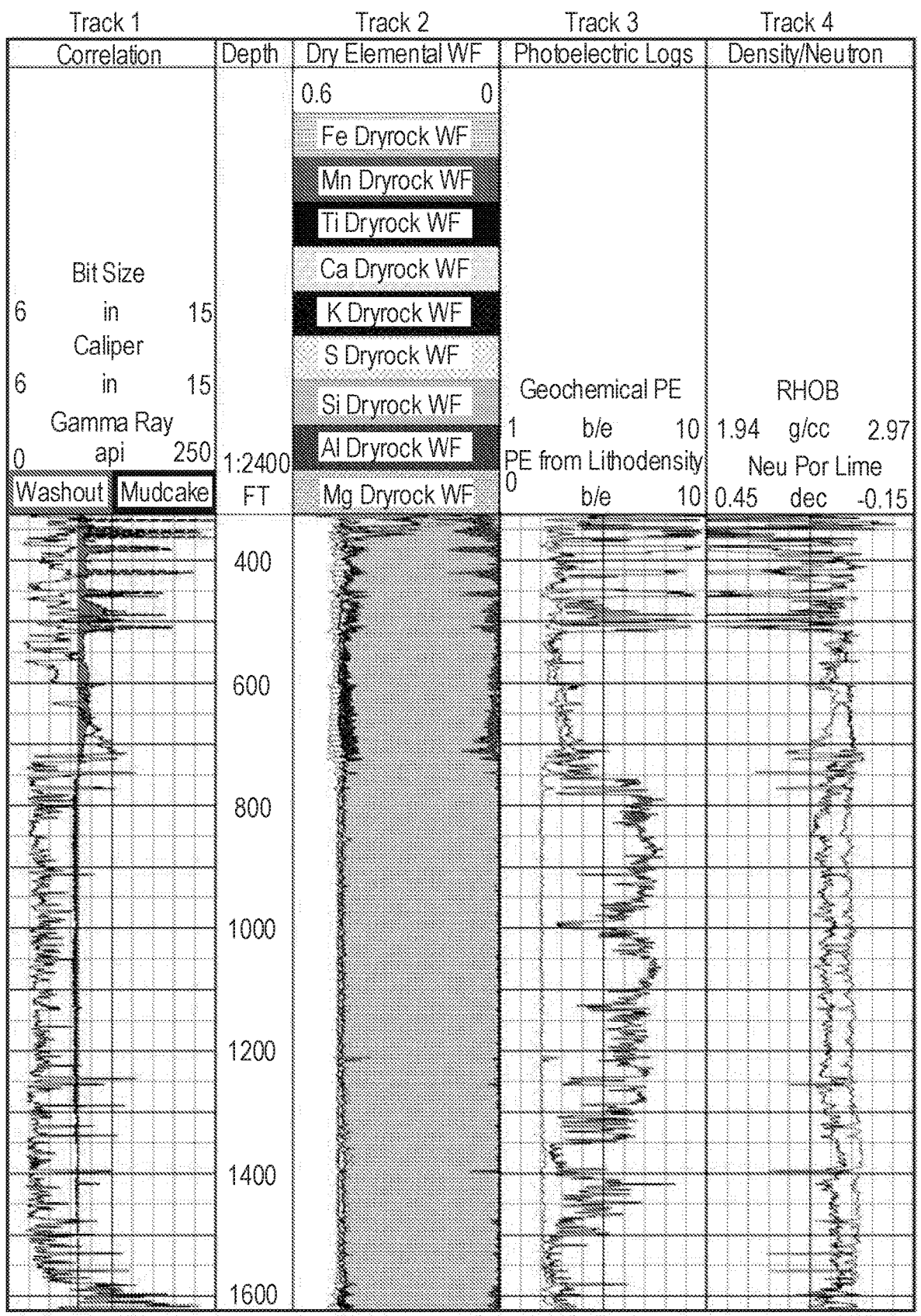

FIGS. 6-9 are log charts showing illustrative log tracks including a geochemical photoelectric log as described herein. In FIGS. 6-9, Track 1 shows caliper and gamma ray logs. In FIG. 9, Track 1 also shows a bit size log. Meanwhile, Track 2 of FIGS. 6-9 shows dry rock elemental concentration logs in a summation format that lends itself to quick-look minerology identification. Track 3 of FIGS. 6-9 show geochemical photoelectric logs and lithodensity photoelectric logs in an overlay format. The geochemical photoelectric logs of FIGS. 6-9 can be determined at least in part using dry rock elemental concentration values obtained from a geochemical logging tool as described herein. Track 4 of FIGS. 6-9 show density and neutron porosity logs.

Figure 6:
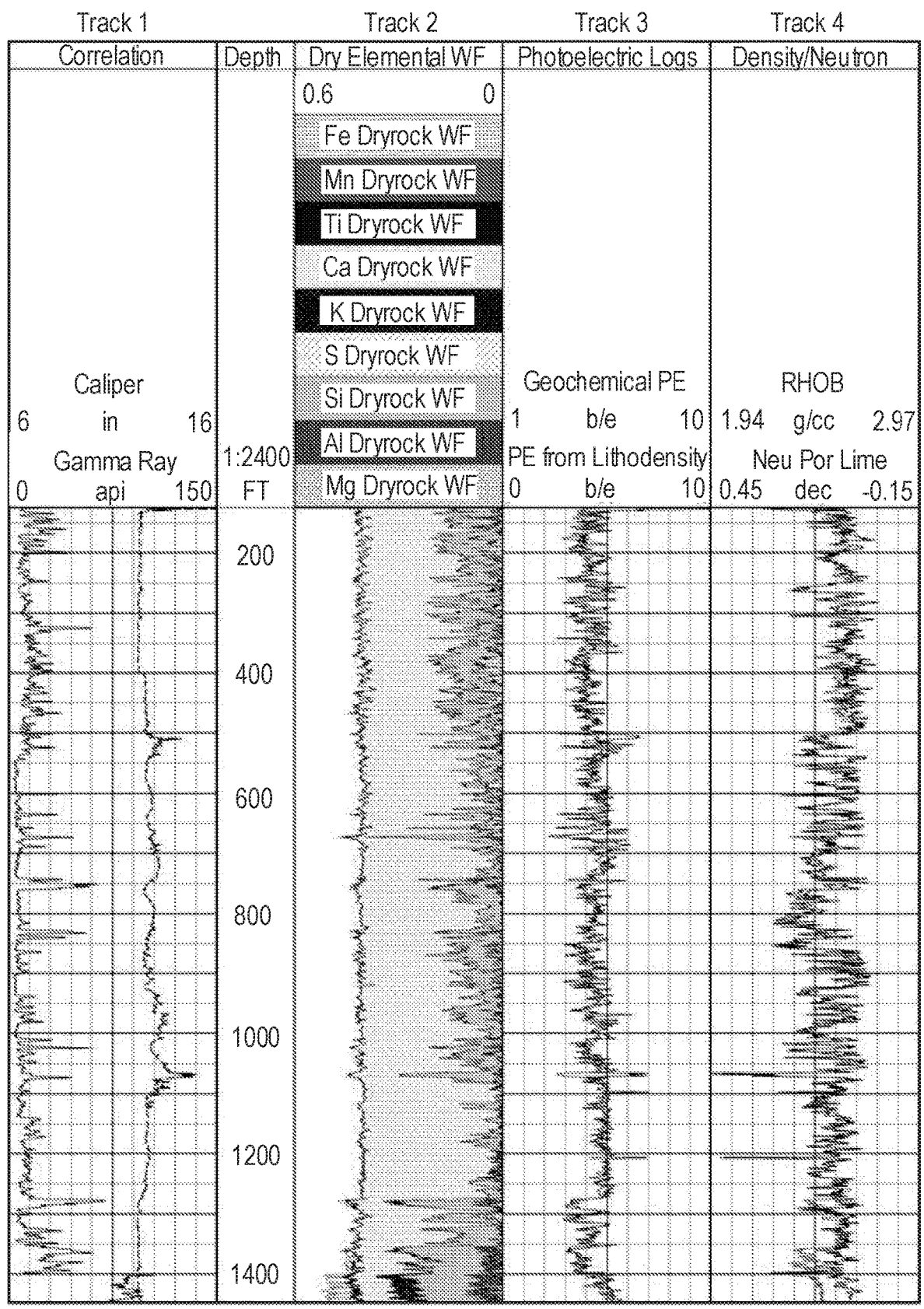
FIGS. 6-9 are log charts showing illustrative log tracks including geochemical photoelectric logs.

In Track 3 of FIG. 6, good agreement between the geochemical photoelectric logs and lithodensity photoelectric logs throughout the log affirm the geochemical logging tool's elemental weight fractions and strengthen confidence in the dry rock elemental concentration values. In FIG. 7, drilling is performed with a 12.25-in. bit and 10.43-lbm/gal calcium-weighted oil-based mud. The resulting well passes through a layer of sandstone at the top, followed by a carbonate interval with a sand-shale sequence at the bottom of the log. In Track 3 of FIG. 7, some differences between the lithodensity photoelectric log and the geochemical photoelectric logs are observed in the sandstone interval from about 800 to 200 which appear to be related to activity in the caliper log in Track 1. Accordingly, one way to interpret the differences between the lithodensity photoelectric log and the geochemical photoelectric logs in Track 3 is that the lithodensity logging tool encountered intermittent loss of pad contact with the borehole wall. Also, the high photoelectric log readings at the top of the log interval could be attributed to the presence of the iron mineral hematite.

In FIG. 8, drilling is performed with a 9.4 lbm/gal water-based mud. The resulting well passes through a shale at the top, followed by a carbonate that grades into a carbonate mudstone and another shale. Additional carbonate material and a dolomite formation can be seen at the bottom of the interval. Overall there is good agreement between the lithodensity photoelectric log and the geochemical photoelectric log throughout the entire interval that spans several formation types.

In FIG. 9, drilling is performed with an 11-lbm/gal mud water-based mud and a 8.75-in. bit. The resulting well passes through a clean sandstone reservoir. The logs of Track 1 indicate a mudcake buildup across the clean sandstone reservoir from around 1600 to 750 and borehole washout from about 750 to 350. The mudcake buildup and the borehole washout (causing rugosity and loss of pad contact) issues compromise the lithodensity photoelectric log of Track 3. The bulk density and neutron porosity curves are recorded on a compatible limestone scale and the 5-6 porosity unit crossover is consistent with expectations for a clean sandstone reservoir and the very high silicon content output from the geochemical logging tool. Upon analysis of the logs in FIG. 9, the geochemical photoelectric log values could be substituted for the lithodensity photoelectric log values when performing formation analysis with log interpretation software.

Figure 10:
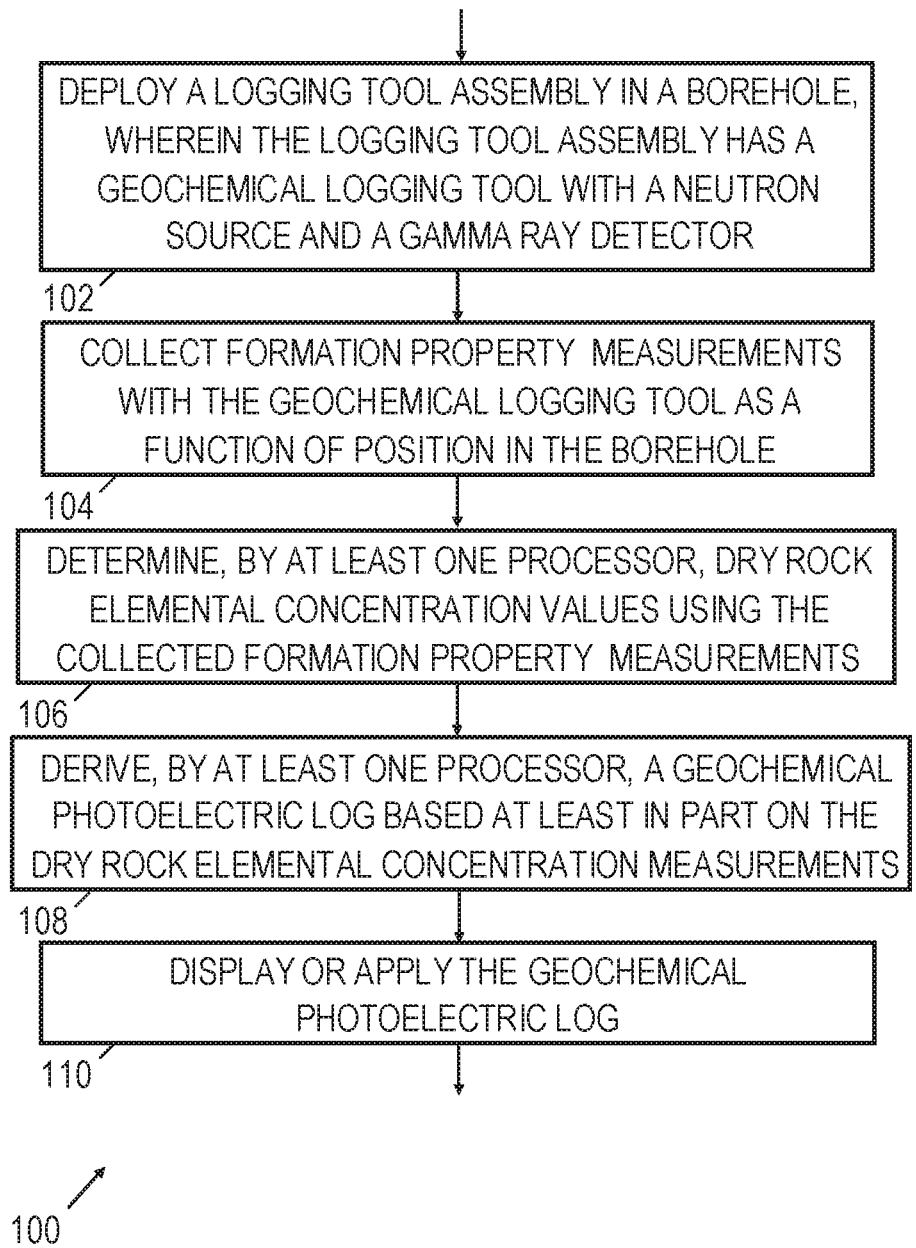
FIG. 10 is a flowchart showing an illustrative geochemical photoelectric logging method.

FIG. 10 is a flowchart showing an illustrative geochemical photoelectric logging method 100. As shown, the method 100 includes deploying a logging tool assembly in a borehole, wherein the logging tool assembly has a geochemical logging tool with a neutron source and a gamma ray detector (block 102). At block 104, formation property measurements are collected with the geochemical logging tool as a function of position in the borehole. At block 106, dry rock elemental concentrations values are determined, by at least one processor, using the collected formation property measurements. At block 108, a geochemical photoelectric log is derived, by at least one processor, based at least in part on the dry rock elemental concentration measurements as described herein. At block 110, the geochemical photoelectric log is applied or displayed. For example, the geochemical photoelectric log can be displayed with other logs as shown in FIGS. 6-9. Additionally or alternatively, some geochemical photoelectric log values can be selectively applied to software-based formation analysis operations (replacing lithodensity photoelectric log values that are unavailable or that are determined to be inaccurate). The processing operations in method 100 can be performed by a downhole processor (e.g., processor 18), a processor at earth's surface (e.g., processor 52), or a combination of processors.

Embodiments disclosed herein include:

A: A system that comprises a logging tool assembly having a geochemical logging tool with a neutron source and a gamma ray detector, wherein the geochemical logging tool collects formation property measurements as a function of position in a borehole. The system also comprises at least one processor that determines dry rock elemental concentration values from the formation property measurements and that derives a geochemical photoelectric log using at least some of the dry rock elemental concentration values.

B: A method that comprises deploying a logging tool assembly in a borehole, wherein the logging tool assembly has a geochemical logging tool with a neutron source and a gamma ray detector. The method also comprises collecting formation property measurements with the geochemical logging tool as a function of position in the borehole. The method also comprises determining, by at least one processor, dry rock elemental concentration values from the collected formation property measurements. The method also comprises deriving, by the at least one processor, a geochemical photoelectric log using at least some of the dry rock elemental concentration values.

Each of the embodiments, A and B, may have one or more of the following additional elements in any combination. Element 1: wherein the at least one processor derives the geochemical photoelectric log by calculating geochemical matrix photoelectric factor values based on weight fraction values corresponding to at least some the dry rock elemental concentration values. Element 2: wherein the at least one processor determines inorganic carbon weight fraction values and calculates the geochemical matrix photoelectric factor values based on the inorganic carbon weight fraction values. Element 3: wherein the at least one processor determines the inorganic carbon weight fraction values as a function of magnesium weight fraction values and calcium weight fraction values corresponding to some of the dry rock elemental concentration values. Element 4: wherein the at least one processor calculates the geochemical matrix photoelectric factor values as a function of matrix oxygen weight fraction values determined from the inorganic carbon weight fraction values and from weight fractions values corresponding to at least some of the dry rock elemental concentration values. Element 5: wherein the at least one processor combines geochemical matrix photoelectric factor values with formation fluid photoelectric factor values to determine formation photoelectric factor values used for the geochemical photoelectric log. Element 6: wherein the at least one processor scales the geochemical matrix photoelectric factor values and the formation fluid photoelectric factor values based on a formation fluid weight fraction. Element 7: wherein the logging tool assembly includes an output device and a lithodensity logging tool with a radioactive source and a gamma ray detector, wherein the processor derives a lithodensity photoelectric log from measurements obtained by the lithodensity logging tool, and wherein the output device displays the geochemical photoelectric log and the lithodensity photoelectric log to a user. Element 8: wherein the logging tool assembly is deployed in the borehole via a drillstring. Element 9: wherein the logging tool assembly is deployed in the borehole via wireline, slick line, or coiled tubing.

Element 10: wherein deriving the geochemical photoelectric log comprises calculating geochemical matrix photoelectric factor values based on weight fractions values corresponding to at least some of the dry rock elemental concentration values. Element 11: wherein deriving the geochemical photoelectric log comprises determining inorganic carbon weight fraction values and calculating the geochemical matrix photoelectric factor values based on the inorganic carbon weight fraction values. Element 12: wherein deriving the geochemical photoelectric log comprises determining the inorganic carbon weight fraction values as a function of magnesium weight fraction values and calcium weight fraction values obtained from the dry rock elemental concentration values. Element 13: wherein deriving the geochemical photoelectric log comprises calculating the geochemical matrix photoelectric factor values as a function of matrix oxygen weight fraction values determined from the inorganic carbon weight fraction values and from weight fractions values corresponding to at least some of the dry rock elemental concentration values. Element 14: wherein deriving the geochemical photoelectric log comprises combining geochemical matrix photoelectric factor values with formation fluid photoelectric factor values to determine formation photoelectric factor values used for the geochemical photoelectric log. Element 15: wherein deriving the geochemical photoelectric log comprises scaling the geochemical matrix photoelectric factor values and the formation fluid photoelectric factor values based on a formation fluid weight fraction. Element 16: wherein the logging tool assembly includes a lithodensity logging tool with a radioactive source and a gamma ray detector, and wherein the method further comprises deriving a lithodensity photoelectric log from measurements obtained by the lithodensity logging tool, and displaying the geochemical photoelectric log and the lithodensity photoelectric log to a user. Element 17: further comprising deploying the logging tool assembly in the borehole via a drillstring. Element 18: further comprising deploying the logging tool assembly in the borehole via wireline, slick line, or coiled tubing.

Numerous other variations and modifications will become apparent to those skilled in the art once the above disclosure is fully appreciated. It is intended that the following claims be interpreted to embrace all such variations and modifications where applicable.

What is claimed is:

1. A system that comprises:
a logging tool assembly having a geochemical logging tool with a neutron source and a gamma ray detector, wherein the geochemical logging tool collects formation property measurements as a function of position in a borehole; and
at least one processor that determines dry rock elemental concentration values from the formation property measurements and that derives a geochemical photoelectric log using at least some of the dry rock elemental concentration values, wherein the at least one processor:
determines inorganic carbon weight fraction values as a function of magnesium weight fraction values and calcium weight fraction values corresponding to some of the dry rock elemental concentration values; and
derives the geochemical photoelectric log by calculating geochemical matrix photoelectric factor values based on weight fraction values corresponding to at least some of the dry rock elemental concentration values and the inorganic carbon weight fraction values.

2. The system of claim 1, wherein the at least one processor calculates the geochemical matrix photoelectric factor values as a function of matrix oxygen weight fraction values determined from the inorganic carbon weight fraction values and from weight fractions values corresponding to at least some of the dry rock elemental concentration values.

3. The system of claim 1, wherein the at least one processor combines geochemical matrix photoelectric factor values with formation fluid photoelectric factor values to determine formation photoelectric factor values used for the geochemical photoelectric log.

4. The system of claim 3, wherein the at least one processor scales the geochemical matrix photoelectric factor values and the formation fluid photoelectric factor values based on a formation fluid weight fraction.

5. The system according to claim 1, wherein the logging tool assembly includes:
an output device; and
a lithodensity logging tool with a radioactive source and a gamma ray detector, wherein the processor derives a lithodensity photoelectric log from measurements obtained by the lithodensity logging tool, and
wherein the output device displays the geochemical photoelectric log and the lithodensity photoelectric log to a user.

6. The system according to claim 1, wherein the logging tool assembly is deployed in the borehole via a drillstring.

7. The system according to claim 1, wherein the logging tool assembly is deployed in the borehole via wireline, slick line, or coiled tubing.

8. A method that comprises:
deploying a logging tool assembly in a borehole, wherein the logging tool assembly has a geochemical logging tool with a neutron source and a gamma ray detector;
collecting formation property measurements with the geochemical logging tool as a function of position in the borehole;
determining, by at least one processor, dry rock elemental concentration values from the collected formation property measurements; and
deriving, by the at least one processor, a geochemical photoelectric log using at least some of the dry rock elemental concentration values, wherein deriving the geochemical photoelectric log comprises:
determining inorganic carbon weight fraction values as a function of magnesium weight fraction values and calcium weight fraction values obtained from the dry rock elemental concentration values; and
calculating geochemical matrix photoelectric factor values based on weight fraction values corresponding to at least some of the dry rock elemental concentration values and the inorganic carbon weight fraction values.

9. The method of claim 8, wherein deriving the geochemical photoelectric log comprises calculating the geochemical matrix photoelectric factor values as a function of matrix oxygen weight fraction values determined from the inorganic carbon weight fraction values and from weight fractions values corresponding to at least some of the dry rock elemental concentration values.

10. The method of claim 8, wherein deriving the geochemical photoelectric log comprises combining geochemical matrix photoelectric factor values with formation fluid photoelectric factor values to determine formation photoelectric factor values used for the geochemical photoelectric log.

11. The method of claim 10, wherein deriving the geochemical photoelectric log comprises scaling the geochemical matrix photoelectric factor values and the formation fluid photoelectric factor values based on a formation fluid weight fraction.

12. The method according to claim 8, wherein the logging tool assembly includes a lithodensity logging tool with a radioactive source and a gamma ray detector, and wherein the method further comprises:

deriving a lithodensity photoelectric log from measurements obtained by the lithodensity logging tool; and displaying the geochemical photoelectric log and the lithodensity photoelectric log to a user.

13. The method according to claim 8, further comprising deploying the logging tool assembly in the borehole via a drillstring.

14. The method according to claim 8, further comprising deploying the logging tool assembly in the borehole via wireline, slick line, or coiled tubing.

\* \* \* \* \*